(12) United States Patent
Yoshida

(10) Patent No.: US 6,950,208 B2
(45) Date of Patent: Sep. 27, 2005

(54) DATA COMMUNICATION APPARATUS AND CONTROL METHOD THEREFOR

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 893 days.

(21) Appl. No.: 09/773,503

(22) Filed: Feb. 2, 2001

(65) Prior Publication Data

US 2001/0015822 A1 Aug. 23, 2001

(30) Foreign Application Priority Data

Feb. 7, 2000 (JP) ........................................ 2000-029490

(51) Int. Cl.[7] .......................... G06F 15/00; H04N 1/00
(52) U.S. Cl. .................. 358/1.9; 358/1.15; 358/1.2; 358/434; 358/435; 358/436; 358/437; 358/439
(58) Field of Search ................................. 358/434–437, 358/1.2, 1.9, 1.15, 439

(56) References Cited

U.S. PATENT DOCUMENTS 5,956,162 A * 9/1999 Nobuta ....................... 358/500
6,674,548 B1 * 1/2004 Kanemitsu .................. 358/401

FOREIGN PATENT DOCUMENTS

EP 0 660 583 A2 6/1995

OTHER PUBLICATIONS

Kenneth McConnell et al., Fax: Facsimile Technology and System, 1999, 3rd Ed, pp 82–85, 90 and 91.*

* cited by examiner

Primary Examiner—Edward Coles
Assistant Examiner—Chan S. Park
(74) Attorney, Agent, or Firm—Fitzpatrick, Cella, Harper & Scinto

(57) ABSTRACT

A conventional data communication apparatus cannot set different receiving capacity for each type of received image data. To solve this problem, a data communication apparatus according to this invention notifies a partner apparatus of the receiving capacity in the normal reception mode of the apparatus at the start of communication. If high-quality transmission is designated for image data transmitted from the partner apparatus, the data communication apparatus determines whether the image data exceeds its own receiving capacity in the high-quality reception mode. If the image data does not exceed the receiving capacity in the high-quality reception mode, the data communication apparatus performs high-quality reception/recording; otherwise, notifies the partner apparatus of its own receiving capacity in the high-quality reception mode.

28 Claims, 5 Drawing Sheets

DATA COMMUNICATION APPARATUS AND CONTROL METHOD THEREFOR

FIELD OF THE INVENTION

The present invention relates to a data communication apparatus capable of communicating multilevel image data, and a control method therefor.

BACKGROUND OF THE INVENTION

Facsimile apparatuses capable of communicating not only a monochrome binary image (to be referred to as a normal image hereinafter) but also a multilevel image (to be referred to as a high-quality image hereinafter) such as a color or grayscale image have conventionally been known.

The conventional facsimile apparatus capable of communicating normal and high-quality images has common setting of the receiving capacity such as the receivable resolution or receivable size regardless of the type of received image, i.e., reception mode.

For example, when the facsimile apparatus supports the A3 size as a maximum receivable size in a normal reception mode in which a normal image is received, it must support the A3 size so as to receive it similarly in a high-quality reception mode in which a high-quality image is received. Also, for example, when the facsimile apparatus supports a resolution of 400 dpi as a maximum receivable resolution in the normal reception mode, it must support reception at the resolution of 400 dpi similarly in the high-quality reception mode.

In this manner, the conventional facsimile apparatus, which supports high receiving capacity in the normal reception mode, must also support high receiving capacity in the high-quality reception mode.

Even if the user wants to change the receiving capacity (maximum receivable size or maximum receivable resolution) between normal and high-quality images in the facsimile apparatus, the facsimile apparatus cannot meet the demand.

To realize, e.g., the same maximum receivable size in the two reception modes, the high-quality reception mode requires a larger-capacity memory and more complicated processing circuit than the normal reception mode. When particularly the maximum receivable size of a high-quality image can be set smaller than that of a normal image, common setting of the maximum receivable size for the two reception modes is wasteful in terms of the cost.

SUMMARY OF THE INVENTION

The present invention has been proposed to solve the conventional problems, and has as its object to provide a data communication apparatus capable of setting different receiving capacity for each data type of received image, and a method therefor.

According to the present invention, the foregoing object is attained by providing a control method for a data communication apparatus capable of receiving binary image data which satisfies a first condition, and multilevel image data which satisfies a second condition different from the first condition, comprising the notification step of notifying a partner apparatus of the first and/or second condition as receivable data information, and the reception step of receiving image data transmitted from the partner apparatus on the basis of the notification in the notification step.

In accordance with the present invention as described above, a receivable data condition, i.e., different receiving capacity can be set for each data type of received image. Accordingly, the minimum function necessary for the data communication apparatus can be implemented by the minimum arrangement.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

<First Embodiment>

Figure 1:
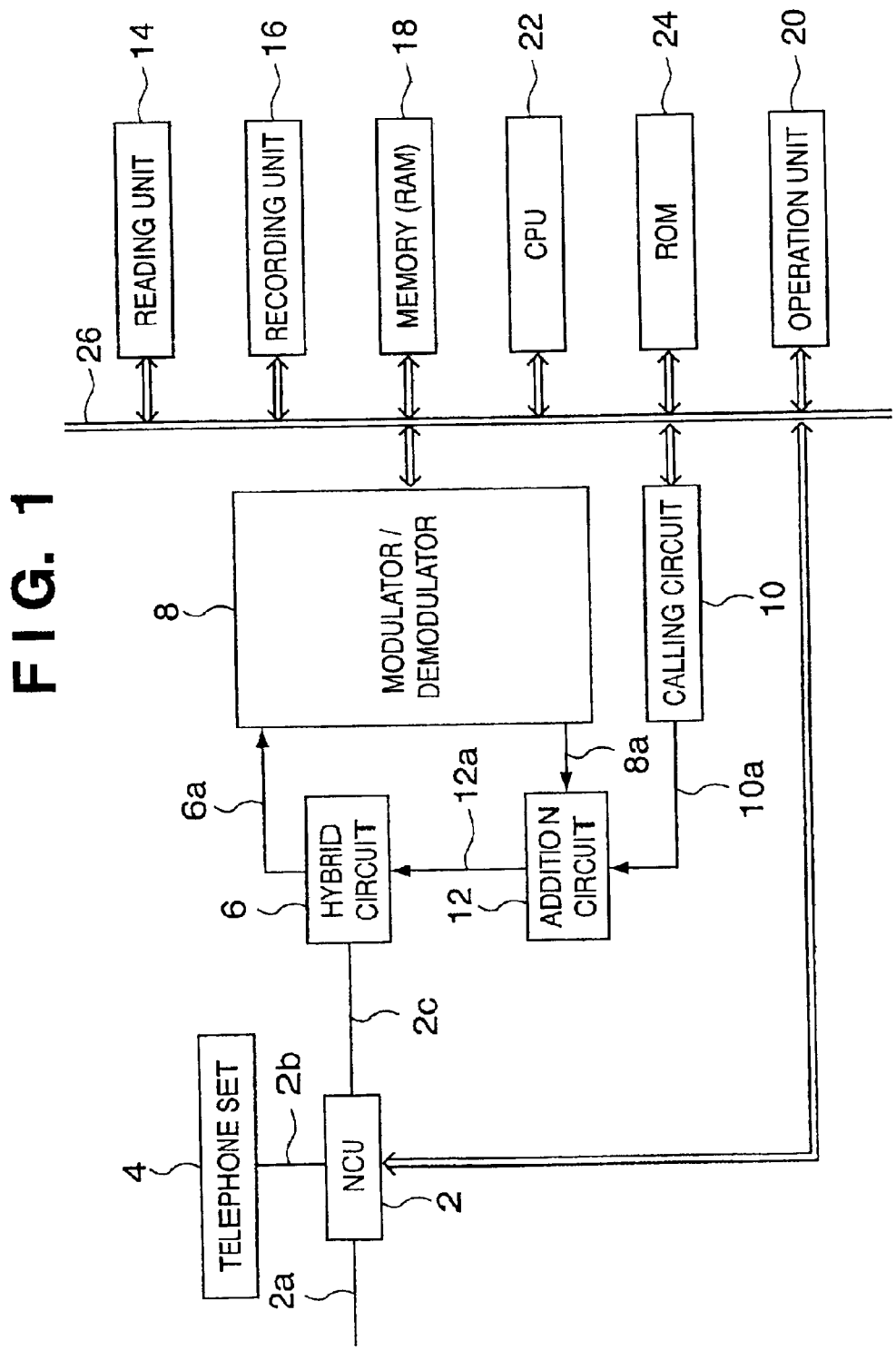
FIG. 1 is a block diagram showing the arrangement of a facsimile apparatus in the first embodiment according to the present invention.

FIG. 1 is a block diagram showing the arrangement of a color facsimile apparatus according to the first embodiment.

In FIG. 1, reference numeral 2 denotes a NCU (Network Control Unit) which is connected to a telephone circuit 2a in order to use a public telephone network for data communication, controls connection to a public switched telephone network via a telephone line 2b, performs switching to a data communication channel 2c, and maintains a communication loop in the apparatus. The NCU 2 switches connection of the telephone circuit 2a to a telephone set 4 (CML off), or connection to the facsimile apparatus (CML on) under the control from a bus 26. In a normal state, the telephone circuit 2a is connected to the telephone set 4.

Reference numeral 6 denotes a hybrid circuit which separates a signal of a transmission system and a signal of a reception system, transmits a transmission signal sent from an addition circuit 12 via a signal line 12a to the telephone circuit 2a via the NCU 2, and receives a signal from the partner via the NCU 2 to send the signal to a modulator/demodulator 8 via a signal line 6a.

The modulator/demodulator 8 modulates and demodulates based on the ITU-T recommendations V.8, V.21, V.27ter, V.29, V.17, and V.34. Each transmission mode is designated under the control from the bus 26. The modulator/demodulator 8 receives a transmission signal via the bus 26 and outputs modulated data to a signal line 8a, whereas it receives a reception signal output to the signal line 6a and outputs demodulated data to the bus 26.

Reference numeral 10 denotes a calling circuit which receives telephone number information based on a signal from the bus 26, and outputs a DTMF selection signal to a signal line 10a. The addition circuit 12 receives information from the signal line 8a and information from the signal line 10a, and outputs the sum to the signal line 12a.

Reference numeral 14 denotes a reading unit which can read color image information, and outputs read data to the bus 26; and 16, a recording unit which can record color image information on a recording medium, and sequentially records information output to the bus 26 in units of lines.

Reference numeral 18 denotes a work memory (RAM) which stores raw information or coded information of data read by the reading unit 14, and stores received information input via the bus 26 or its decoded information. In the first embodiment, when the facsimile apparatus cannot receive a high-quality image (color or grayscale image) at a resolution and size designated by the partner, it notifies again the partner of maximum receiving capacity (receivable resolution, receivable size, or the like) in high-quality communication instead of maximum receiving capacity notified for the first time. The memory 18 can store a count value in re-notifying operation for each destination.

Reference numeral 20 denotes an operation unit which comprises a one-touch dial, abbreviated dial, ten-key pad, * and # keys, start key, stop key, registration instruction key to the memory 18, and other function keys. Key information pressed by the user is output to the bus 26.

Reference numeral 22 denotes a CPU (Central Processing Unit) which controls the overall facsimile apparatus of the first embodiment, and executes a facsimile transmission control sequence. This control program is stored in a ROM 24.

An outline of a characteristic operation in the facsimile apparatus of the first embodiment having the above arrangement will be explained.

The facsimile apparatus (to be referred to as the apparatus hereinafter) of the first embodiment has a normal reception mode in which a normal monochrome binary image is received, and a high-quality reception mode in which a high-quality image such as a color or grayscale image is received, and can set different receiving capacity in each mode.

When the receiving capacity in the high-quality reception mode is lower than that in the normal reception mode, the apparatus notifies a communication partner apparatus of the maximum receiving capacity of the apparatus, i.e., the receiving capacity in the normal reception mode as a first initial identification signal.

When the partner apparatus notifies the apparatus of transmission of a high-quality image, and the apparatus cannot receive in the designated transmission mode, i.e., cannot directly receive the high-quality image, the apparatus notifies the partner apparatus of its own receiving capacity in the high-quality reception mode as a second initial identification signal (protocol change notification).

At this time, the apparatus stores the number of protocol change notification operations (to be referred to as a change notification history hereinafter) in the memory 18 for each partner apparatus, i.e., originating terminal. For a destination for which the apparatus has successively made change notification a plurality of number of times, the apparatus notifies the destination of its own receiving capacity in the high-quality reception mode as a first initial identification signal in next reception.

Figure 2A:
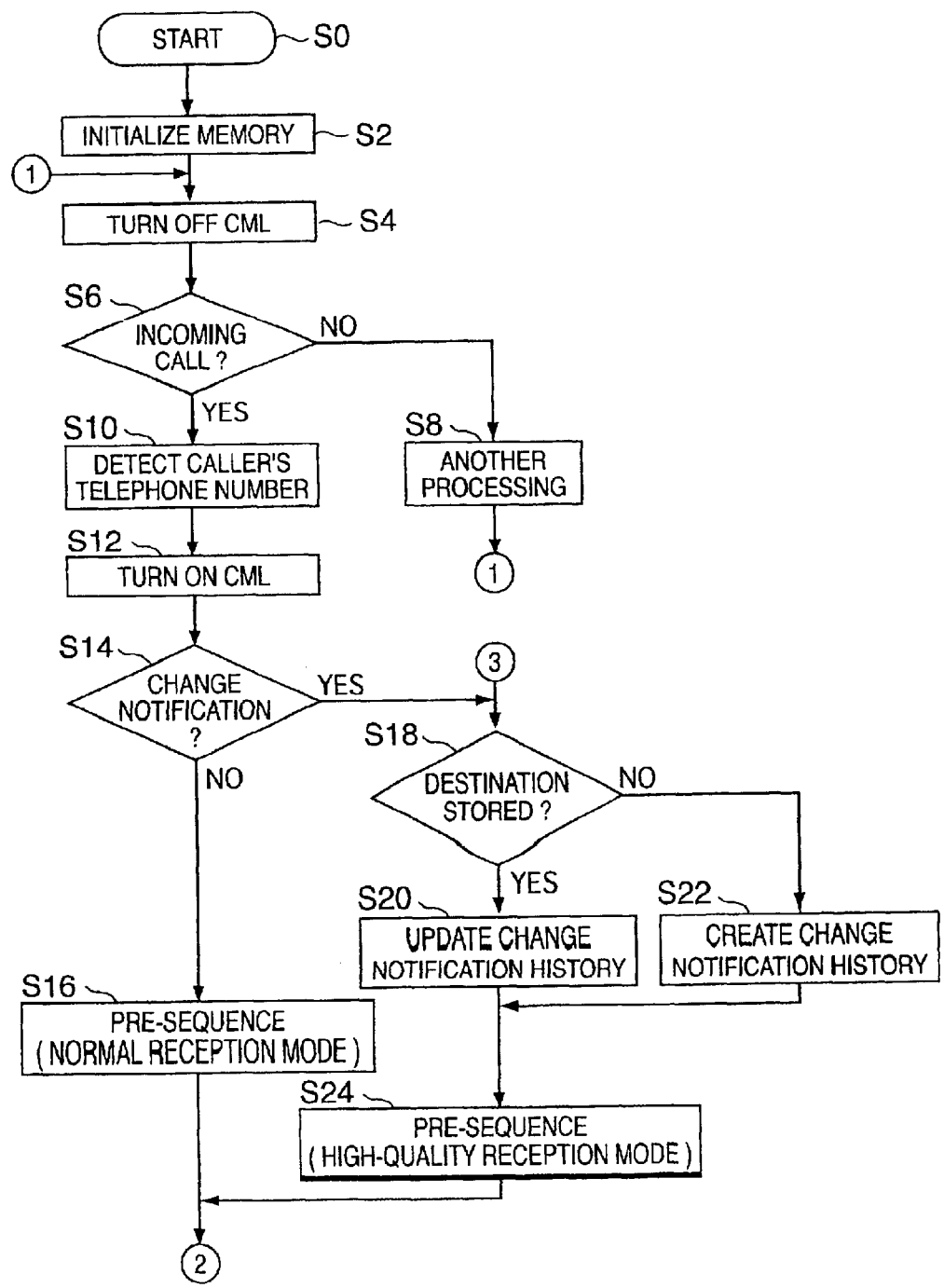
FIGS. 2A and 2B are flow charts showing an operation in the first embodiment.
Figure 2B:
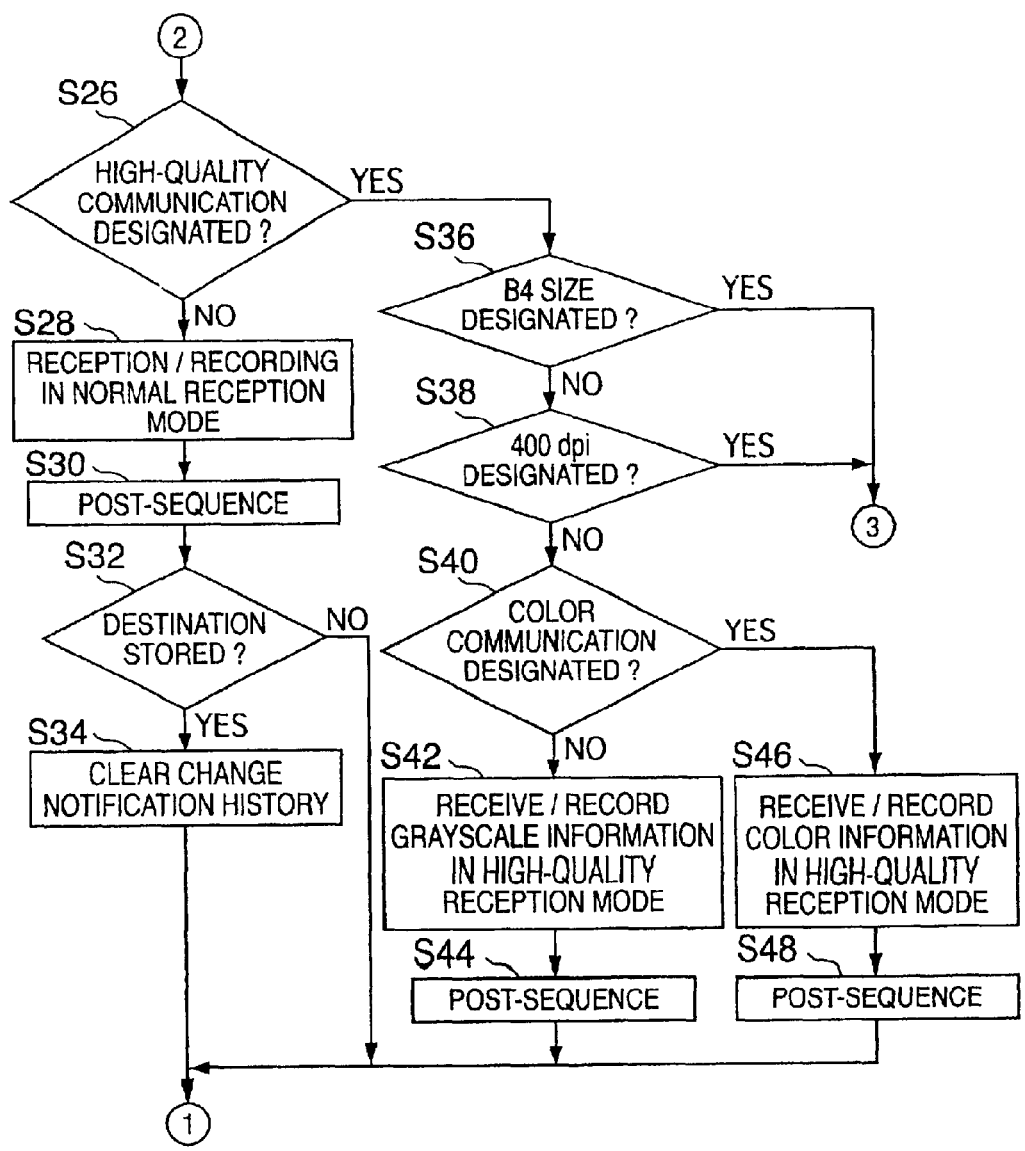

The operation of the apparatus will be explained in detail with reference to flow charts shown in FIGS. 2A and 2B. These flow charts show the contents of a control program stored in the ROM 24, and the control program is executed by the CPU 22.

If the apparatus starts communication with the partner apparatus (step S0), the CPU 22 of the apparatus initializes the memory 18 via the bus 26 (step S2). The CPU 22 turns off the CML of the NCU 2 via the bus 26 (step S4).

The CPU 22 checks the presence of an incoming call step S6. If NO in step S6, the CPU 22 executes another processing (step S8), and returns to step S4. If YES in step S6, the CPU 22 detects caller's telephone number information (step S10), and turns on the CML of the NCU 2 via the bus 26 (step S12).

By referring to the change notification history held in the memory 18 via the bus 26, the CPU 22 determines whether to notify the partner apparatus represented by the detected caller's telephone number of changed receiving capacity (step S14). More specifically, the CPU 22 determines whether the receiving capacity in the normal reception mode of which the partner apparatus was notified once was changed to the receiving capacity in the high-quality reception mode, and the partner apparatus has been notified (re-notified) of the changed receiving capacity successively five times. If change notification has been executed successively five times, the CPU 22 determines that the partner apparatus will be notified of the changed receiving capacity, i.e., the receiving capacity in the high-quality reception mode, and shifts to step S18.

If the successive number of change notification operations is less than five times, the CPU 22 determines that the receiving capacity in the normal reception mode will be notified, and shifts to step S16. As a pre-sequence of data communication, the CPU 22 notifies the partner apparatus of the receiving capacity (e.g., B4 size and 400 dpi) corresponding to the normal reception mode of the apparatus and that reception in JPEG and color modes is possible.

In step S18, the CPU 22 checks whether the destination detected as the originating-side telephone number information has been stored in the memory 18. If YES in step S18, the CPU 22 increments the change notification history of the destination via the bus 26 (step S20). If NO in step S18, the CPU 22 sets "1" as the change notification history corresponding to the destination, and stores the history in the memory 18 (step S22). After the change notification history is updated or created, the CPU 22 advances to step S24, and as a pre-sequence of data communication, notifies the partner apparatus of the receiving capacity (e.g., A4 size and 200 dpi) corresponding to the high-quality reception mode of the apparatus and that reception in JPEG and color modes is possible.

After the partner apparatus is notified of the receiving capacity corresponding to the normal reception mode or high-quality reception mode, the CPU 22 determines in step S26 whether the partner apparatus designates high-quality communication of transmitting a color or grayscale image.

If NO in step S26, the CPU 22 shifts to step S28, receives a binary image signal in the normal reception mode at a size and resolution designated by the partner apparatus, records the received image, and executes a post-sequence of communication (step S30). The CPU 22 advances to step S32, and determines whether the destination detected as the originating-side telephone number information has been stored in the memory 18. If YES in step S32, the CPU 22 clears the change notification history corresponding to the destination via the bus 26 (step S34); and if NO, the CPU 22 returns to step S4.

If YES in step S26, the CPU 22 determines whether transmission at the B4 size or 400 dpi has been designated (steps S36 and S38). These values are image specifications which cannot be processed in the high-quality reception mode of the apparatus. If NO in steps S36 and S38, the CPU 22 determines whether cover communication has been designated (step S40).

If NO in step S40, the CPU 22 receives and records grayscale image information at a designated size and resolution other than the B4 size and 400 dpi (step S42), and performs a post-sequence (step S44). If YES in step S40, the CPU 22 receives and records color image information at a designated size and resolution other than the B4 size and 400 dpi (step S46), and performs a post-sequence (step S48).

If YES in step S36 or S38, the CPU 22 shifts to step S18, updates or creates the change notification history (step S20 or S22), and notifies the partner apparatus of the receiving capacity (e.g., A4 size and 200 dpi) corresponding to the high-quality reception mode and that reception in JPEG and color modes is possible (step S24).

According to the first embodiment, if the CPU 22 determines based on the change notification history that change notification should be done (S14), and high-quality communication at the B4 or 400 dpi that cannot be processed in the normal reception mode is designated (S36 or S38), the CPU 22 executes processing in steps S18 to S24, and notifies again the partner apparatus of the receiving capacity corresponding to the high-quality reception mode.

As described above, the first embodiment can support the B4 size and 400 dpi in the normal reception mode and the A4 size and 200 dpi in the high-quality reception mode as the receiving capacity of the apparatus. Since different receiving capacities can be respectively set for normal and high-quality images, the first embodiment can provide a color communication function coping with user needs.

In data reception from a destination which frequently transmits high-quality images, the receiving apparatus is notified of the receiving capacity in the high-quality reception mode from the beginning. This can shorten a pre-sequence in communication. More specifically, notification of the receiving capacity in the normal reception mode shown in step S16 of the flow charts shown in FIGS. 2A and 2B can be omitted.

Since the receiving apparatus can be notified of the receiving capacity in the high-quality reception mode from the beginning, an error which may occur owing to change notification of a pre-sequence can be avoided.

<Second Embodiment>

The second embodiment according to the present invention will be described.

A color facsimile apparatus in the second embodiment has the same arrangement as that in the first embodiment. Thus, the same reference numerals as in the first embodiment denote the same parts, and a description thereof will be omitted.

In the first embodiment, the partner apparatus is notified of the receiving capacities in the normal reception mode and high-quality reception mode at different timings. In the second embodiment, the partner apparatus is notified of the two receiving capacities at the same timing.

Figure 3A:
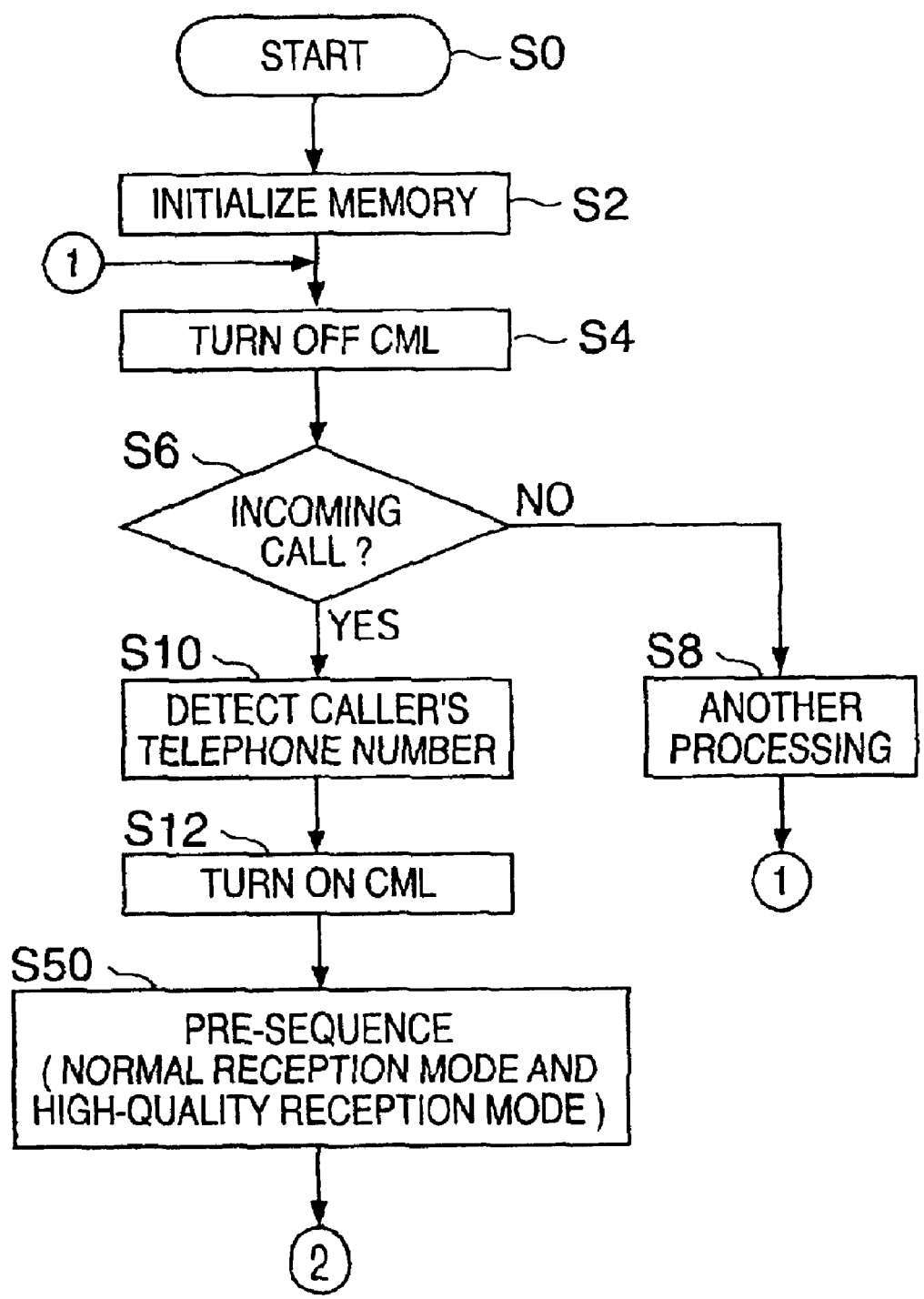
FIGS. 3A and 3B are flow charts showing an operation in the second embodiment.
Figure 3B:
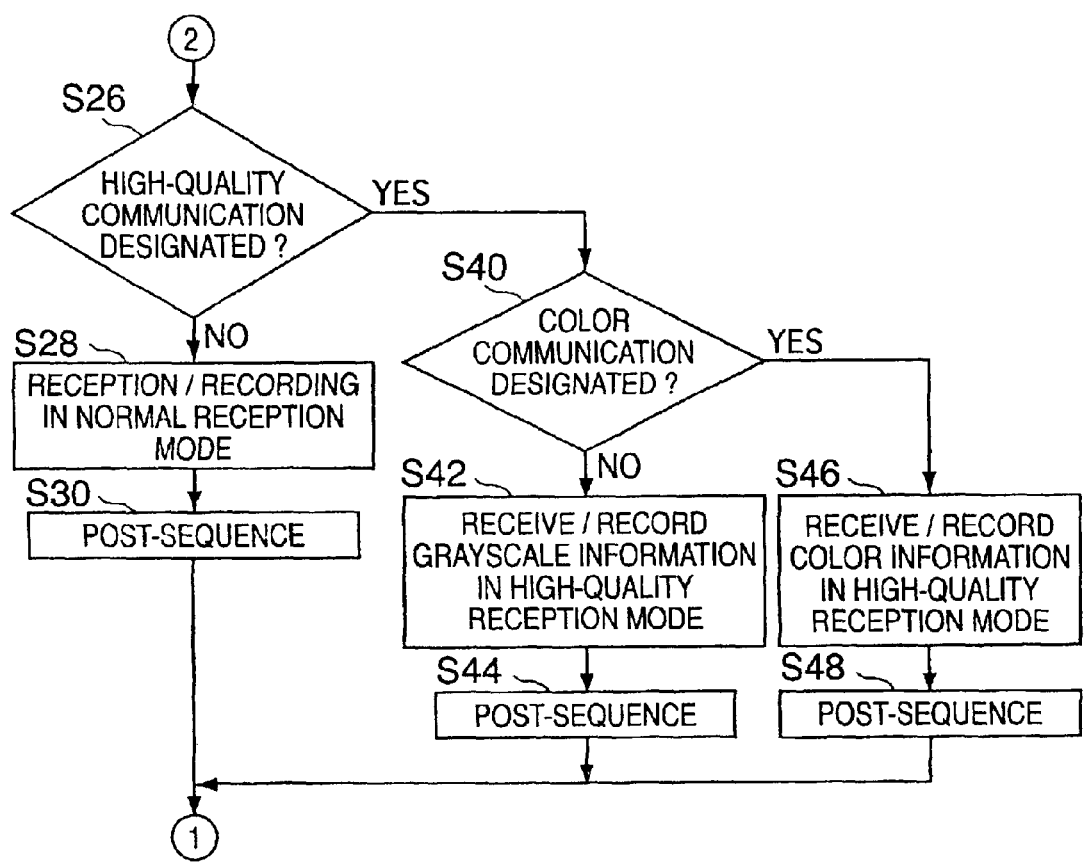

The operation of the facsimile apparatus in the second embodiment will be explained in detail with reference to flow charts shown in FIGS. 3A and 3B, and is basically the same as the operation in FIGS. 2A and 2B described in the first embodiment. Hence, the same step numbers as in the first embodiment denote the same processing steps, and only different processing steps will be described. FIGS. 3A and 3B show the contents of a control program stored in a ROM 24, and the control program is executed by a CPU 22.

In FIGS. 3A and 3B, if the CPU 22 detects the presence of an incoming call (step S6), it detects caller's telephone number information (step S10), and turns on the CML (step S12). As a pre-sequence of data communication, the CPU 22 notifies in step S50 the partner apparatus of the receiving capacities in the normal reception mode and high-quality reception mode as the receiving capacity of the apparatus. More specifically, the CPU 22 notifies the partner apparatus of the receiving capacity (B4 size and 400 dpi) corresponding to the normal reception mode and that reception in JPEG and color modes is possible, and of the receiving capacity (A4 size and 200 dpi) corresponding to the high-quality reception mode and that reception in JPEG and color modes is possible. Note that the two receiving capacities are independently notified.

After notification of the receiving capacities in step S50, the CPU 22 shifts to step S26, and checks whether the partner apparatus designates communication of a high-quality image. In the second embodiment, if YES in step S26, the CPU 22 determines whether the partner apparatus designates color communication without determining whether the partner apparatus designates transmission at the B4 size or 400 dpi (step S40).

If NO in step S26, the CPU 22 receives and records a binary image signal in the normal reception mode in step S28, executes a post-sequence in step S30, and returns to step S4.

In the second embodiment, change notification history processing (corresponding to steps S20, S22, and S34) in the first embodiment, and change notification (corresponding to step S24) to the receiving capacity corresponding to the high-quality reception mode are substantially omitted. This is because the receiving capacities in the normal reception mode and high-quality reception mode of the apparatus are exchanged at once regardless of the type of received image data in the second embodiment. The partner apparatus, therefore, determines the quality of image data to be transmitted in consideration of the two notified receiving capacities, and starts communication. As described above, the second embodiment can independently notify the partner of the receiving capacities in the normal reception mode and high-quality reception mode by one pre-sequence, i.e., initial identification signal.

The receiving capacities in the two reception modes can be arbitrarily set, and in addition the time until the protocol is established is shortened. Since the communication sequence is simple, generation of a communication trouble is also suppressed.

[Other Embodiment]

The present invention may be applied to a system constituted by a plurality of devices (e.g., a host computer, interface device, reader, and printer) or an apparatus comprising a single device (e.g., a copying machine or facsimile apparatus).

The object of the present invention is realized even by supplying a storage medium (or recording medium) which records software program codes for realizing the functions of the above-described embodiments to a system or apparatus, and causing the computer (or a CPU or MPU) of the system or apparatus to read out and execute the program codes stored in the storage medium. In this case, the program codes read out from the storage medium realize the functions of the above-described embodiments by themselves, and the storage medium which stores the program codes constitutes the present invention. The functions of the above-described embodiments are realized not only when the computer executes the readout program codes, but also when the OS (Operating System) running on the computer performs part or all of actual processing on the basis of the instructions of the program codes.

The functions of the above-described embodiments are also realized when the program codes read out from the storage medium are written in the memory of a function expansion card inserted into the computer or that of a function expansion unit connected to the computer, and the CPU of the function expansion card or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

What is claimed is:

1. A control method for a data communication apparatus capable of receiving binary image data having a first resolution and a second resolution lower than the first resolution, and color image data having the second resolution comprising:
    the first notification step of notifying a partner apparatus of an image data reception function having the first resolution and a color image data reception function as maximum receiving capacity;
    the determination step of determining whether the partner apparatus instructs transmission of color image data at the first resolution on the basis of the notification in the first notification step; and
    the second notification step of notifying the partner apparatus of an image data reception function having the second resolution and the color image data reception function as receiving capacity when transmission of color image data at the first resolution is determined in the determination step to be instructed;
    the history holding step of holding an execution history of the second notification step for each of a plurality of communication partners including the partner apparatus; and
    the control step of controlling which of the first and second notification steps is executed on the communication with the partner apparatus.

2. The method according to claim 1, wherein the control step comprises executing the second notification step at start of communication with the partner apparatus when the second notification step has been executed for the partner apparatus successively a plurality of number of times.

3. A data communication apparatus capable of receiving binary image data having a first resolution and a second resolution lower than the first resolution, and color image data having the second resolution, comprising:
    notification means for notifying a partner apparatus of receiving capacity of said apparatus; and
    reception means for receiving data transmitted from the partner apparatus,
    wherein said notification means notifies the partner apparatus of an image data reception function having the first resolution and a color image data reception function as maximum receiving capacity at start of communication with the partner apparatus, and when the partner apparatus instructs transmission of color image data at the first resolution, notifies the partner apparatus of an image data reception function having the second resolution and the color image data reception function as receiving capacity; and
    history holding means for holding a history of sending a second condition by said notification means for each of a plurality of communication partners including the partner apparatus,
    wherein said notification means determines which of first and second receiving capacities the partner apparatus is to be notified of, on the basis of the execution history at start of communication with the partner apparatus.

4. The apparatus according to claim 3, wherein said notification means sends the second condition at start of communication with the partner apparatus when the partner apparatus has been notified of the second condition successively a plurality of number of times.

5. A control method for a data communication apparatus capable of receiving binary image data which satisfied a first condition, and multilevel image data which satisfies a second condition different from the first condition, comprising:
    the notification step of notifying a partner apparatus of the first and/or second condition as receivable data information; and
    the reception step of receiving image data transmitted from the partner apparatus on the basis of the notification in the notification step,
    wherein the notification step comprises:
        the first notification step of notifying the partner apparatus of the first condition as receivable data information;
        the determination step of determining whether the multilevel image data satisfies the second condition when the partner apparatus instructs transmission of multilevel image data on the basis of the notification in the first notification step; and
        the second notification step of notifying the partner apparatus of the second condition as receivable data information when the multilevel image data is determined in the determination step not to satisfy the second condition, and
    wherein the determination step comprises determining whether the multilevel image data satisfies the second condition when the multilevel image data is data based on the first condition.

6. A control method for a data communication apparatus capable of receiving binary image data which satisfied a first condition, and multilevel image data which satisfies a second condition different from the first condition, comprising:
    the notification step of notifying a partner apparatus of the first and/or second condition as receivable data information; and
    the reception step of receiving image data transmitted from the partner apparatus on the basis of the notification in the notification step,
    wherein the notification step comprises:
        the first notification step of notifying the partner apparatus of the first condition as receivable data information;
        the determination step of determining whether the multilevel image data satisfies the second condition when the partner apparatus instructs transmission of multilevel image data on the basis of the notification in the first notification step; and
    the second notification step of notifying the partner apparatus of the second condition as receivable data information when the multilevel image data is determined in the determination step not to satisfy the second condition, and
    wherein the first notification step is executed at start of communication with the partner apparatus.

7. A control method for a data communication apparatus capable of receiving binary image data which satisfied a first condition, and multilevel image data which satisfies a second condition different from the first condition, comprising:

the notification step of notifying a partner apparatus of the first and/or second condition as receivable data information; and the reception step of receiving image data transmitted from the partner apparatus on the basis of the notification in the notification step, wherein the notification step comprises:

the first notification step of notifying the partner apparatus of the first condition as receivable data information;

the determination step of determining whether the multilevel image data satisfies the second condition when the partner apparatus instructs transmission of multilevel image data on the basis of the notification in the first notification step; and the second notification step of notifying the partner apparatus of the second condition as receivable data information when the multilevel image data is determined in the determination step not to satisfy the second condition, and wherein the determination step comprises determining whether the multilevel image data satisfies the second condition even when the partner apparatus instructs transmission of multilevel image data on the basis of the notification in the second notification step.

8. The method according to claim 7, wherein the multilevel image data includes color image data, and the notification step further comprises notifying the partner apparatus that color image data can be received.

9. The method according to claim 7, wherein the first condition sets a maximum resolution of the binary image data as a first resolution; and the second condition sets a maximum resolution of the multilevel image data as a second resolution lower than the first resolution.

10. The method according to claim 7, wherein the first condition sets a resolution of the binary image data as either of first and second resolutions, and the second condition sets a resolution of the multilevel image data as the second resolution.

11. The method according to claim 7, wherein the first condition sets a maximum size of the binary image data as a first size, and the second condition sets a maximum size of the multilevel image data as a second size smaller than the first size.

12. The method according to claim 7, further comprising:

the history holding step of holding an execution history of the second notification step for each of a plurality of communication partners including the partner apparatus; and the control step of controlling which of the first and second notification steps is executed on the basis of the execution history at start of communication with the partner apparatus.

13. The method according to claim 12, wherein the control step comprises executing the second notification step at start of communication with the partner apparatus when the second notification step has been executed for the partner apparatus successively a plurality of number of times.

14. The method according to claim 7, wherein the notification step comprises notifying the partner apparatus of the first and second conditions at once.

15. The method according to claim 14, wherein the notification step comprises sending the first and second conditions by an initial identification signal.

16. A data communication apparatus capable of receiving binary image data which satisfies a first condition, and multilevel image data which satisfies a second condition different from the first condition, comprising:

notification means for notifying a partner apparatus of the first and/or second condition as receivable data information; and reception means for receiving image data transmitted from the partner apparatus on the basis of the notification by said notification means, wherein said notification means notifies the partner apparatus of the first condition at start of communication with the partner apparatus, and when the partner apparatus instructs transmission of multilevel image data, and the multilevel image data does not satisfy the second condition, notifies the partner apparatus of the second condition, and wherein said notification means determines whether the multilevel image data satisfies the second condition when the multilevel image data is data based on the first condition.

17. A data communication apparatus capable of receiving binary image data which satisfies a first condition, and multilevel image data which satisfies a second condition different from the first condition, comprising:

notification means for notifying a partner apparatus of the first and/or second condition as receivable data information; and reception means for receiving image data transmitted from the partner apparatus on the basis of the notification by said notification means, wherein said notification means notifies the partner apparatus of the first condition at start of communication with the partner apparatus, and when the partner apparatus instructs transmission of multilevel image data, and the multilevel image data does not satisfy the second condition, notifies the partner apparatus of the second condition, and wherein said apparatus further comprises history holding means for holding a history of sending the second condition by said notifying means for each of a plurality of communication partners including the partner apparatus, and said notification means determines which of first and second receiving capacities the partner apparatus is to be notified of, on the basis of the execution history at start of communication with the partner apparatus.

18. The apparatus according to claim 17, wherein said notification means sends the second condition at start of communication with the partner apparatus when the partner apparatus has been notified of the second condition successively a plurality of number of times.

19. The apparatus according to claim 14, wherein the multilevel image data includes color image data, and said notification means further notifies the partner apparatus that color image data can be received.

20. The apparatus according to claim 18, wherein the first condition sets a maximum resolution of the binary image data as a first resolution, and the second condition sets a maximum resolution of the multilevel image data as a second resolution lower than the first resolution.

21. The apparatus according to claim 18, wherein
the first condition sets a resolution of the binary image data as either of first and second resolutions, and
the second condition sets a resolution of the multilevel image data as the second resolution.

22. The apparatus according to claim 18, wherein
the first condition sets a maximum size of the binary image data as a first size, and
the second condition sets a maximum size of the multilevel image data as a second size smaller than the first size.

23. The apparatus according to claim 18, wherein said notification means notifies the partner apparatus of the first and second condition at once.

24. The apparatus according to claim 23, wherein said notification means sends the first and second conditions by an initial identification signal.

25. A control program for a data communication apparatus capable of receiving binary image data having a first resolution and a second resolution lower than the first resolution, and color image data having the second resolution, comprising:
a code of the first notification step of notifying a partner apparatus of an image data reception function having the first resolution and a color image data reception function as maximum receiving capacity;
a code of the determination step of determining whether the partner apparatus instructs transmission of color image data at the first resolution on the basis of the notification in the first notification step;
a code of the second notification step of notifying the partner apparatus of an image data reception function having the second resolution and the color image data reception function as receiving capacity when transmission of color image data as the first resolution is determined in the determination step to be instructed;
a code of the history holding step of holding an execution history of the second notification step for each of a plurality of communication partners including the partner apparatus; and
a code of the control step of controlling which of the first and second notification steps is executed on the communication with the partner apparatus.

26. A control program for a data communication apparatus capable of receiving binary image data which satisfies a first condition, and multilevel image data which satisfies a second condition different from the first condition, comprising:
a code of the notification step of notifying a partner apparatus of the first and/or second condition as receivable data information; and
a code of the reception step of receiving image data transmitted from the partner apparatus on the basis of the notification in the notification step,
wherein the notification step comprises:
the first notification step of notifying the partner apparatus of the first condition as receivable data information;
the determination step of determining whether the multilevel image data satisfies the second condition when the partner apparatus instructs transmission of multilevel image data on the basis of the notification in the first notification step; and
the second notification step of notifying the partner apparatus of the second condition as receivable data information when the multilevel image data is determined in the determination step not to satisfy the second condition, and
wherein the determination step comprises determining whether the multilevel image data satisfies the second condition even when the partner apparatus instructs transmission of multilevel image data on the basis of the notification in the second notification step.

27. A recording medium which records a control program for a data communication apparatus capable of receiving a binary image data having a first resolution and a second resolution lower than the first resolution, and color image data having the second resolution, the control program comprising:
a code of the first notification step of notifying a partner apparatus of an image data reception function having the first resolution and a color image data reception function as maximum receiving capacity;
a code of the determination step of determining whether the partner apparatus instructs transmission of color image data at the first resolution on the basis of the notification in the first notification step;
a code of the second notification step of notifying the partner apparatus of an image data reception function having the second resolution and the color image data reception function as receiving capacity when transmission of color image data at the capacity when transmission of color image data at the first resolution is determined in the determination step to be instructed;
a code of the history holding step of holding an execution history of the second notification step for each of a plurality of communication partners including the partner apparatus; and
a code of the control step of controlling which of the first and second notification steps is executed on the communication with the partner apparatus.

28. A recording medium which records a control program for a data communication apparatus capable of receiving binary image data which satisfies a first condition, and multilevel image data which satisfies a second condition different from the first condition, the control program comprising:
a code of the notification step of notifying a partner apparatus of the first and/or second condition as receivable data information; and
a code of the reception step of receiving image data transmitted from the partner apparatus on the basis of the notification in the notification step
wherein the notification step comprises:
the first notification step of notifying the partner apparatus of the first condition as receivable data information;
the determination step of determining whether the multilevel image data satisfies the second condition when the partner apparatus instructs transmission of multilevel image data on the basis of the notification in the first notification step; and
the second notification step of notifying the partner apparatus of the second condition as receivable data information when the multilevel image data is determined in the determination step not to satisfy the second condition, and
wherein the determination step comprises determining whether the multilevel image data satisfies the second condition even when the partner apparatus instructs transmission of multilevel image data on the basis of the notification in the second notification step.

* * * * *

UNITED STATES PATENT AND TRADEMARK OFFICE
CERTIFICATE OF CORRECTION

PATENT NO. : 6,950,208 B2
DATED : September 27, 2005
INVENTOR(S) : Takehiro Yoshida It is certified that error appears in the above-identified patent and that said Letters Patent is hereby corrected as shown below:

Column 1,
Line 60, "comprising" should read -- comprising: --.

Column 7,
Lines 29 and 54, "and" should be deleted.

Column 10,
Line 42, "and" should be deleted;
Line 48, "said" should read -- wherein said --; and
Line 57, "claim 14," should read -- claim 18, --.

Column 11,
Line 14, "condition" should read -- conditions --.

Column 12,
Line 46, "step" should read -- step, --.

Signed and Sealed this

Eleventh Day of April, 2006

JON W. DUDAS
*Director of the United States Patent and Trademark Office*